United States Patent [19]

van Hauten

[11] Patent Number: 4,527,453
[45] Date of Patent: Jul. 9, 1985

[54] MITER SAW EQUIPPED WITH MEANS FOR LOCKING THE SAW TABLE

[75] Inventor: Hartmut van Hauten, Wiesbaden, Fed. Rep. of Germany

[73] Assignee: Black & Decker Inc., Newark, Del.

[21] Appl. No.: 601,587

[22] Filed: Apr. 18, 1984

[30] Foreign Application Priority Data

Apr. 19, 1983 [DE] Fed. Rep. of Germany ....... 8311514

[51] Int. Cl.³ ............................................... B27B 9/00
[52] U.S. Cl. .................................. 83/467 R; 83/471.3; 83/490; 83/581
[58] Field of Search .................. 83/467 R, 468, 471.3, 83/490, 574, 581

[56] References Cited
U.S. PATENT DOCUMENTS 3,574,315 4/1971 Boultinghouse ..................... 83/490
3,672,251 6/1972 Jaegers ............................. 83/490 X Primary Examiner—James M. Meister
Attorney, Agent, or Firm—Ronald B. Sherer; Edward D. Murphy; Harold Weinstein

[57] ABSTRACT

A miter saw having a saw table which carries the saw unit and is rotatably mounted in a base plate is provided with means for locking the saw table. Such locking means comprise at least one through bore in the fence extending over the upper surface of the saw table and a bolt having a circular cross-section and being rotatably fitted in the through bore. Both the through bore and the bolt comprise an annular shoulder continuously increasing its distance from the saw table. The annular shoulders are in engagement and by rotating the bolt its end surface can be pressed onto the saw table.

20 Claims, 3 Drawing Figures

MITER SAW EQUIPPED WITH MEANS FOR LOCKING THE SAW TABLE

BACKGROUND OF THE INVENTION

The invention relates to a miter saw having means for locking the saw table which carries the saw unit and is rotatably mounted in a base plate, wherein a stop or fence is provided on the base plate and extends over the upper surface of the saw table.

In these known miter saws, in which the saw unit is lowered with the saw blade onto the workpiece to be cut through and which rests on the saw table, the saw unit is fixed to the latter, so that by rotating the saw table there is an angular adjustment of the saw blade and the saw blade slot receiving the latter with respect to the workpiece contact surface of the fence, in order to set the miter, i.e. to make a cut through the workpiece sloping with respect to the workpiece contact surface of the fence.

It must obviously be possible to lock the saw table in any of its operating positions with respect to the base plate and the fence, so that there is no adjustment thereto during sawing operation. Thus, for example, it is already known to provide in the base plate a through taphole, whose longitudinal axis extends in a plane parallel to the plane of the saw table supporting surface. A clamping screw is screwed into this taphole from the outside of the base plate and presses by its end against the circumferential surface of the saw table and consequently holds the latter in the set position. However, such a locking means is relatively complicated to manufacture, because the manufacture of the taphole involves at least one and usually two machining operations, namely the machining of a through-bore on the one hand and the tapping on the other. Even if the base plate is cast in a mould and optionally the fence in one piece therewith, it is only possible to manufacture a through bore, so that subsequently a tapping operation is necessary.

The object of the invention is to provide means for locking the saw table of a miter saw requiring no separate machining operation.

SUMMARY OF THE INVENTION

According to the invention, this objective is achieved by the present invention which comprises a miter saw, wherein at least one through bore having a circular cross-section is provided in the fence and its lower end is located in the fence face facing the saw table. The lower end area of the through bore has a larger diameter than the through bore area connected thereto and the annular shoulder forming the transition between the areas continuously increases its distance from the saw table, at least over part of its circumference. A bolt having a circular cross-section is rotatably fitted into the through bore which bolt has a lower end portion, whose external diameter is slightly smaller than the internal diameter of the lower end area of the through bore. The external diameter of the portion of the bolt connected to its lower end portion is slightly smaller than the internal diameter of the through bore area connected to the end area. The annular shoulder formed between the end portion of the bolt and the portion along part of its circumference, whose circumferential extension substantially corresponds to that of the part of the annular shoulder of the through bore increasing its distance from the saw table, continuously increases its distance from the saw table with the same pitch as the distance-increasing part of the annular shoulder of the through bore.

Preferably, the spacing of the annular shoulders or the parts thereof varies with a constant pitch.

Thus, the saw table locking means according to the invention uses at least one through bore formed in the fence which through bore can be formed during the casting or injection moulding of the fence. From the side which subsequently face the saw table, a bolt is inserted in this through bore. This insertion takes place prior to the assembly of the saw table in the base plate, if the base plate and fence are constructed in one piece. Whilst the bolt is inserted prior to the fixing of the fence onto the base plate already holding the saw table, if the fence and the base plate are made from separate parts, which are for example to be joined together by screwing. The through bore has an annular shoulder with a continuous annular surface increasing its distance from the saw table and cooperating with the annular surface continuously rising with the same pitch and formed by the bolt. Thus, by rotation, the bolt can be moved from a release position into a locking position in which, due to the cooperation between the annular surfaces, its end face is displaced downwards in the direction of the saw table and is brought into clamping engagement therewith, so that the saw table is locked in position. No more than one complete rotation is required for displacing the bolt between the release position and the locking position.

Preferably, the distance of the annular shoulder from the saw table increases in each case over 360° of its circumference, i.e. annular surfaces are formed which, starting at one point, rise over 360°, so that the point with the smallest spacing from the saw table and the point with the largest spacing therefrom are interconnected by an axially directed connecting surface.

In order to obtain a maximum uniform distribution of the clamping and/or locking forces on the surface of the saw table, the lower end face of the bolt can be flat, so that the entire lower end face of the bolt rests on the saw table in the locked position.

An easy rotation of the bolt can be achieved in that its upper end projects at the top out of the through bore, and if the circumferential surface of the bolt part projecting at the top from the through bore is structured, i.e. is "roughened" by knurling or milling, the bolt can be easily turned by hand between the release position and the locking position.

In order to be able to manufacture the bolt as simply as possible and cause no damage to the saw table surfaces by the engagement with said table, the bolt can be made from plastic, e.g. by injection moulding and can then be inserted in the through bore without any reworking.

The material consumption for the bolt can be reduced by constructing it in cup-shaped manner, whilst providing its opening at the lower end. Thus, the bolt is closed at the top, so that no dirt particles and the like can get into it, whilst the end face of the bolt engaging with the saw table surface is annular.

In order to obtain an optimum secure locking and uniform distribution of the locking forces, the fence can have identically constructed through bores on facing sides of the saw table and close to its outer circumference. In these are inserted identically constructed bolts, so that locking takes place at two points of the saw table which are at a considerable distance from one another, so that the table is reliably secured against undesired rotation.

BRIEF DESCRIPTION OF THE DRAWINGS

The invention is described in greater detail hereinafter relative to a non-limitative embodiment and the attached drawings, in which.

DETAILED DESCRIPTION OF THE PREFERRED EMBODIMENT OF THE PRESENT INVENTION

Figure 1:
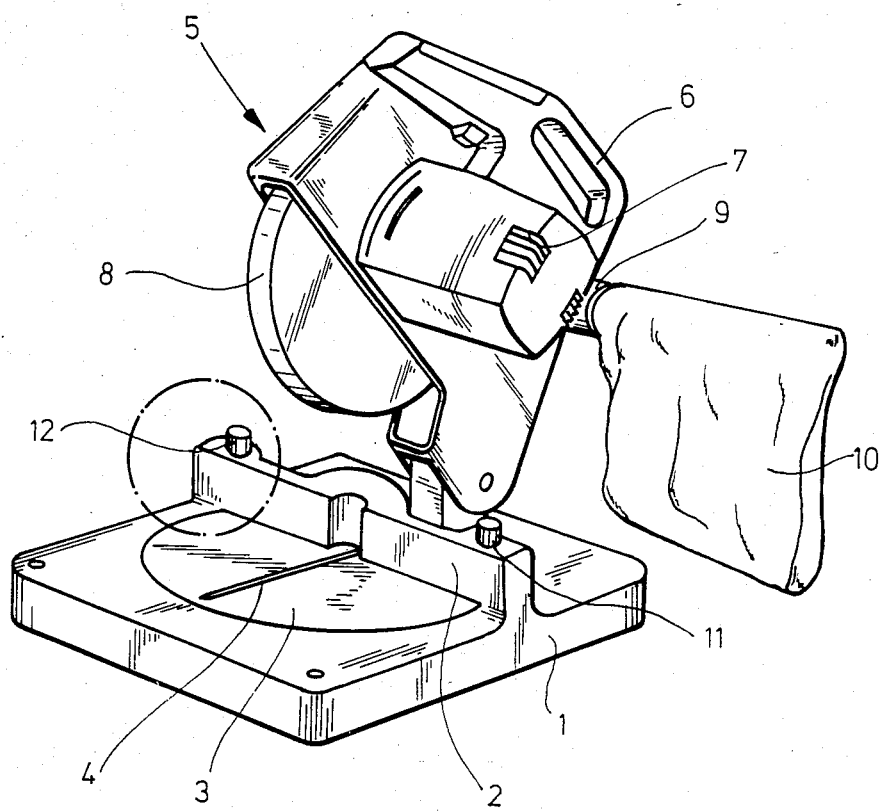
FIG. 1 in perspective view a miter saw with saw table locking means.

The miter saw shown in FIG. 1 has a base plate 1 with a central opening, over which extends the fence 2 constructed in one piece with base plate 1. A saw table 3 is rotatably inserted into the central opening and is held therein in not shown manner, e.g. with the aid of a support plate screwed against the base plate 1 from below. To the saw table is articulated the saw unit 5, which has a drive motor housed in a motor casing 7 for rotating the not shown saw blade, as well as a handle 6. An outlet connection 9 is provided on the saw unit casing and on this connection is mounted a dust and shavings collecting bag 10. In the represented, raised inoperative position, the saw blade is covered by a blade guard 8, which is automatically pivoted on swinging the saw unit 5 down into the working position, so that the rotary saw blade is freed and can be engaged with the workpiece, which is normally in engagement with fence 2 and which is located on saw table 3. In order to be able to completely lower saw unit 5 and cut through workpieces by means of the saw blade, a conventional slot 4 is provided in the saw table 3 into which the saw blade can be introduced.

Figure 2:
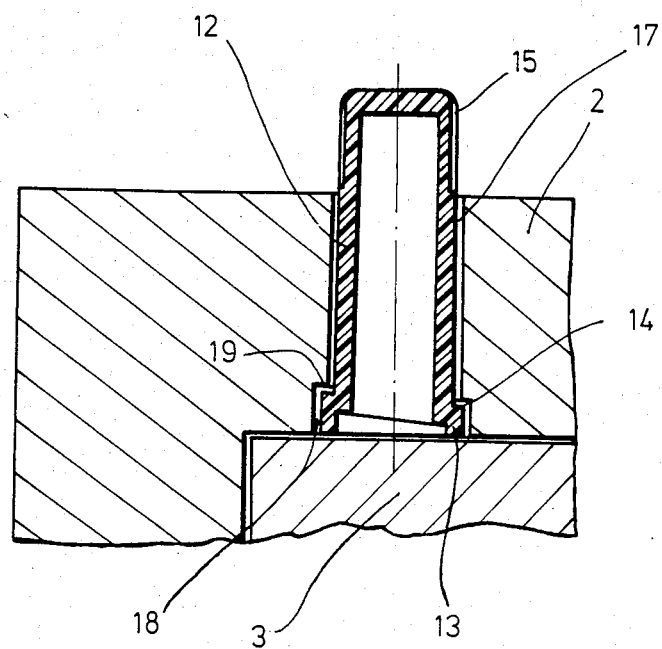
FIG. 2 a partial section through the encircled area of FIG. 1.
Figure 3:
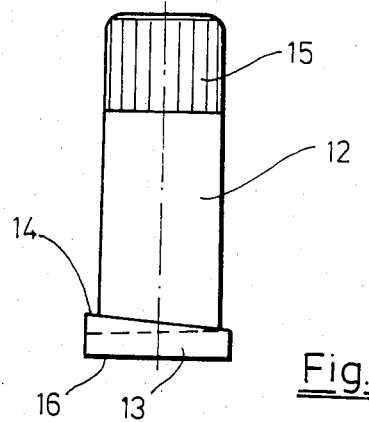
FIG. 3 a view of a bolt for the saw table locking means.

In order to fix the saw table 3 and consequently the saw unit 5 in a predetermined position relative to fence 2, the latter has two through bores with a circular cross-section which are positioned close to the outer circumference of the saw table 3. These through bores receive bolts 11, 12, which also have a circular cross-section and whereof through bore 17 and bolt 12 can be seen in FIG. 2, whilst bolt 12 can be seen in FIG. 3. The through bore for bolt 11 is constructed in the same way as through bore 17 for bolt 12, whilst bolt 11 is shaped in the same way as bolt 12.

The through bore 17 extends from the upper face of fence 2 to its lower face facing table 3 and at the lower end, i.e. at the end adjacent to table 3, has an end area 18, whose diameter is larger than the diameter of the remaining part of through bore 17. As a result of this widening of bore 17, an annular shoulder 19 is formed, which increases its distance from saw table 3 with a constant pitch over its entire circumference, i.e. over 360° from a starting point to an end point.

Into through bore 17 is inserted a bolt 12, which is for example made from plastic and is cup-shaped, so that it is open at the bottom. Bolt 12 is inserted from the bottom into through bore 17, i.e. before saw table 3 was mounted in base plate 1. The bolt has a lower end portion 13, which is located in the widened end area 18 of through bore 17. In the transition area to the remainder of bolt 12 is provided an annular shoulder 14, which increases its distance from the saw table with the same pitch as annular shoulder 19. As can more particularly be gathered from FIG. 3, the annular shoulder passes from a point adjacent to saw table 3, rises along the dotted line and then in accordance with the unbroken line moves constantly away from saw table 3. Thus, as in the case of annular shoulder 19, such pitch extends over 360°, so that between saw table 3 on the closest part of the annular shoulder and the part of the latter furthest from the saw table is provided a not shown, axially directed transition area.

Bolt 12 is inserted in rotary manner in through bore 17, i.e. the external dimensions of bolt 12 are selected in such a way that on the one hand it fits into through bore 17 without rattling, but on the other hand permits a rotation about its longitudinal axis. The upper end of bolt 12 projects out of through bore 17 and has a knurled circumferential surface 15. Thus, bolt 12 can be gripped in the vicinity of circumferential surface 15 and turned about its longitudinal axis. The annular shoulder 14 of bolt 12 thereby slides along annular shoulder 19 of through bore 17 and, due to the relative movement of the two annular shoulders, bolt 12 is displaced in the direction of saw table 3, and due to the slope of the annular shoulders is pressed with its planar, annular end face 16 against the surface of saw table 3. As a result, saw table 3 is prevented from rotating with respect ro fence 2.

The same action is obtained through a corresponding function of bolt 11, i.e. saw table 3 can be subject to the action of a locking clamping force at two points relatively remote from one another and consequently be secured in the desired position.

The locking action is discontinued by rotating bolts 11 and 12 in the opposite direction, so that then annular shoulder 14 can once again slide along annular shoulder 19 and the clamping force is removed.

What I claim is:

1. A miter saw comprising:

a saw table rotatably mounted in a base plate and carrying a pivotably mounted saw unit;

a fence mounted on said base plate and extending over the upper surface of the saw table, in which fence at least one through bore having a circular cross-section is provided with a lower end located in a fence face facing said saw table, said lower end of said through bore having a larger diameter than an upper portion of said through bore connected thereto with an annular shoulder forming the transition therebetween;

said annular shoulder continuously increasing in distance from said saw table at least over part of the circumference of said shoulder;

a bolt having a circular cross-section being rotatably fitted into the through bore, said bolt having a lower end portion whose external diameter is slightly smaller than the diameter of said lower end of the through bore, and a stem portion connected to said lower end portion and having an external diameter slightly smaller than the diameter of said upper portion of the through bore;

a second annular shoulder formed between said lower end and stem portions of said bolt, said second annular shoulder engaging said annular shoulder of said through bore, and said second annular shoulder, at least over part of the circumferences thereof, continuously increasing in distance from said saw table with the same pitch as the distance-increasing part of said annular shoulder of said through bore.

2. A miter saw according to claim 1, wherein the distances of said annular shoulders from said saw table increase over 360° of the circumference thereof.

3. A miter saw according to claim 1 or 2, wherein the part of said annular shoulder of said through bore increasing its distance from said saw table has a constant pitch.

4. A miter saw according to claim 1, wherein the lower end of said bolt is flat.

5. A miter saw according to claim 1, wherein the upper end of said bolt projects at the top out of said through bore.

6. A miter saw according to claim 5, wherein the circumferential surface of the bolt part projecting at the top out of said through bore is structured.

7. A miter saw according to claim 1, wherein said bolt is made from plastic.

8. A miter saw according to claim 1, wherein said bolt is cup-shaped and is open at the lower end.

9. A miter saw according to claim 1, wherein at opposite sides of said saw table and close to the outer circumference thereof, said fence has identically constructed through bores, into each of which is inserted one of an identical pair of bolts.

10. The miter saw of claim 1, wherein an upper portion of said clamping member projects out of the upper end of said through bore, whereby said clamping member can be manually gripped and rotated.

11. The miter saw of claim 10, wherein said clamping member is cup-shaped with an opening at the lower end thereof.

12. The miter saw of claim 10, wherein at opposite sides of said table and close to the outer circumference thereof, said fence has identically constructed through bores, into each of which is inserted one of an identical pair of clamping members.

13. A miter saw, comprising:
   a saw table rotatably mounted on a base plate;
   a saw unit mounted on the saw table;
   a fence extending over an upper surface of the saw table and having a lower face overlying said saw table;
   at least one through bore located in the fence;
   said through bore having an enlarged lower end communicating with said lower face of the fence;
   an annular surface defined by an upper portion of said enlarged lower end, the distance between said lower face of the fence and said annular surface increasing over at least part of the circumference of said annular surface; and
   a clamping member rotatably located in said through bore, said clamping member having a lower portion adapted to co-operate with said annular surface, whereby on rotation of said clamping member in said through bore, said clamping member is operable to clamp and to release the saw table relative to said base plate.

14. The miter saw of claim 13, wherein said enlarged lower end of said through bore has a larger diameter than the remaining portion of the through bore communicating therewith and said annular surface forms the transition therebetween.

15. The miter saw of claim 13, wherein said distance between said lower face of the fence and said annular surface increases continuously over said part of the annular surface.

16. The miter saw of claim 15, wherein said distance increases at a constant pitch.

17. The miter saw of claim 13, wherein said clamping member has a circular cross-section over at least part of the length thereof, said lower portion of said clamping member having an external diameter slightly smaller than the internal diameter of said enlarged lower end of said through bore, a shaft portion of said clamping member having an external diameter slightly smaller than the internal diameter of a respective portion of said through bore.

18. The miter saw of claim 17, wherein said clamping member has an annular shoulder for engagement with said annular surface of the through bore, a portion of said annular shoulder being complementary in contour to said at least part of said annular surface.

19. The miter saw of claim 18, wherein the distance between said annular surface and said lower face of the fence varies over 360° of the circumference of said annular surface.

20. A miter saw comprising:
   a saw table rotatably mounted in a base plate and carrying a pivotably mounted saw unit;
   a fence mounted on said base plate and extending over an upper surface of said saw table;
   said fence having a through bore therethrough in a direction transverse to said upper surface, said through bore having a circular cross-section and having a lower end located in a face of said fence facing downwardly towards said saw table;
   said through bore being formed at said lower end with a portion of larger diameter than remainder of the through bore with a downwardly facing annular surface formed at a transition between said lower end portion and said remainder of the through bore;
   said annular surface being inclined to said direction and continuously increasing in distance from said saw table at least over part of the cirmucference of said annular surface;
   a bolt having a circular cross-section and rotatably located in said through bore;
   said bolt having a lower end part with an external diameter slightly smaller than the diameter of said lower end of the through bore, and a shank part connected to said lower end part with an external diameter slightly smaller than the diameter of said remainder of the through bore;
   an upwardly facing annular shoulder formed between said lower end part and said shank part, said annular shoulder engaging and cooperating with said annular surface and similarly increasing in distance from said saw table, at least over part of the circumference of said annular shoulder, with the same pitch as said annular surface; and
   said shank part extending upwardly above said fence and having a roughened portion for rotating by hand to cause said annular shoulder to rotate relative to said annular surface to effect clamping of said saw table between said bolt and said base plate.

* * * * *